(12) United States Patent
Kotani (10) Patent No.: US 7,329,198 B2
(45) Date of Patent: Feb. 12, 2008

(54) SILENT CHAIN

(75) Inventor: Kazufumi Kotani, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 11/507,923

(22) Filed: Aug. 22, 2006

(65) Prior Publication Data
US 2007/0072718 A1    Mar. 29, 2007

(30) Foreign Application Priority Data

Sep. 27, 2005    (JP)    ............... 2005-280309

(51) Int. Cl.
*F16G 3/14*    (2006.01)
(52) U.S. Cl. .................................... 474/212
(58) Field of Classification Search ............. 474/206, 474/208, 212, 213, 218, 220, 221, 223, 233
See application file for complete search history.

(56) References Cited

U.S. PATENT DOCUMENTS

| 761,035 A | * | 5/1904 | Dodge | ..................... 474/219 |
| 1,180,577 A | * | 4/1916 | Edan | ..................... 474/230 |
| 1,727,129 A | * | 9/1929 | Morse | ..................... 474/213 |
| 3,068,712 A | * | 12/1962 | Kuntzmann | ............. 474/207 |
| 3,877,688 A | * | 4/1975 | McCarty | ................ 267/159 |
| 5,322,483 A | * | 6/1994 | Wang | ..................... 474/206 |
| 5,645,503 A | | 7/1997 | Okuda et al. | |
| 6,394,923 B1 | * | 5/2002 | Huang | ..................... 474/231 |
| 6,406,394 B1 | * | 6/2002 | Bubel et al. | ............. 474/212 |

FOREIGN PATENT DOCUMENTS

| EP | 1 128 090 A3 | 12/2001 |
| EP | 1 482 206 A3 | 6/2005 |
| JP | 08-074939 | 3/1996 |
| JP | 2000-304105 | 11/2000 |

* cited by examiner

Primary Examiner—Vicky A. Johnson
(74) Attorney, Agent, or Firm—Howson & Howson LLP (57) ABSTRACT

In a silent chain composed of interleaved rows of link plates held by connecting pins secured to guide plates disposed along the sides of the chain, the guide plates are formed with protrusions, and are deformed so that they exert a spring action on the rows of link plates through the protrusions, pressing the link plates against one another to increase the frictional contact between the link plates, and thereby reduce vibration and vibration noise.

1 Claim, 13 Drawing Sheets

SILENT CHAIN

CROSS-REFERENCE TO RELATED APPLICATION

This application claims priority on the basis of Japanese patent application 2005-280309, filed Sep. 27, 2005. The disclosure of Japanese application 2005-280309 is hereby incorporated by reference.

FIELD OF THE INVENTION

This invention relates to silent chains, and more specifically to the suppression of noise due to vibration of a silent chain in a free span region between a driving sprocket and a driven sprocket in a silent chain transmission.

BACKGROUND OF THE INVENTION

A silent chain is generally formed of link plates, each having a pair of pin insertion holes and a pair of sprocket-engaging teeth, the link plates being disposed in rows extending widthwise of the chain, and the link plates of each row being displaced in the longitudinal direction of the chain relative to, and interleaved with, the link plates of an adjacent row, the interleaved link plates being arranged to form an endless loop. The chain has guide plates, each having a pair of pin holes, disposed on both sides of the chain. Connecting pins, secured to pin holes of the guide plates, extend through pin holes of the link plates. The connecting pins are typically rocker pins composed of a long pin and a short pin, or single pins having a circular cross-section.

When the silent chain travels between a driving sprocket and a driven sprocket, the adjacent rows of link plates can rotate relative to one another about the connecting pins. Polygonal motion of the chain as it engages and disengages a sprocket, causes vibration in the free spans of the chain between the sprockets, and the relative rotation of the link plates about the connecting pins allows the free span of the chain to flex freely, causing the generation of noise.

To suppress vibration noise, spring links or plate-shaped springs have been provided at a central location widthwise of the chain to bias the link plates of the chain laterally outward toward the guide plates. The biasing force exerted by the spring links or plate-shaped springs increases the surface pressure exerted between adjacent link plates, restricting relative rotation of the adjacent link plates and thereby suppressing noise due to vibration in the free span regions of the chain. This approach is described in Japanese Laid-Open Patent Publication No. Hei-8-74939 and Japanese Laid-Open Patent Publication No. 2000-304105

Figure 9:
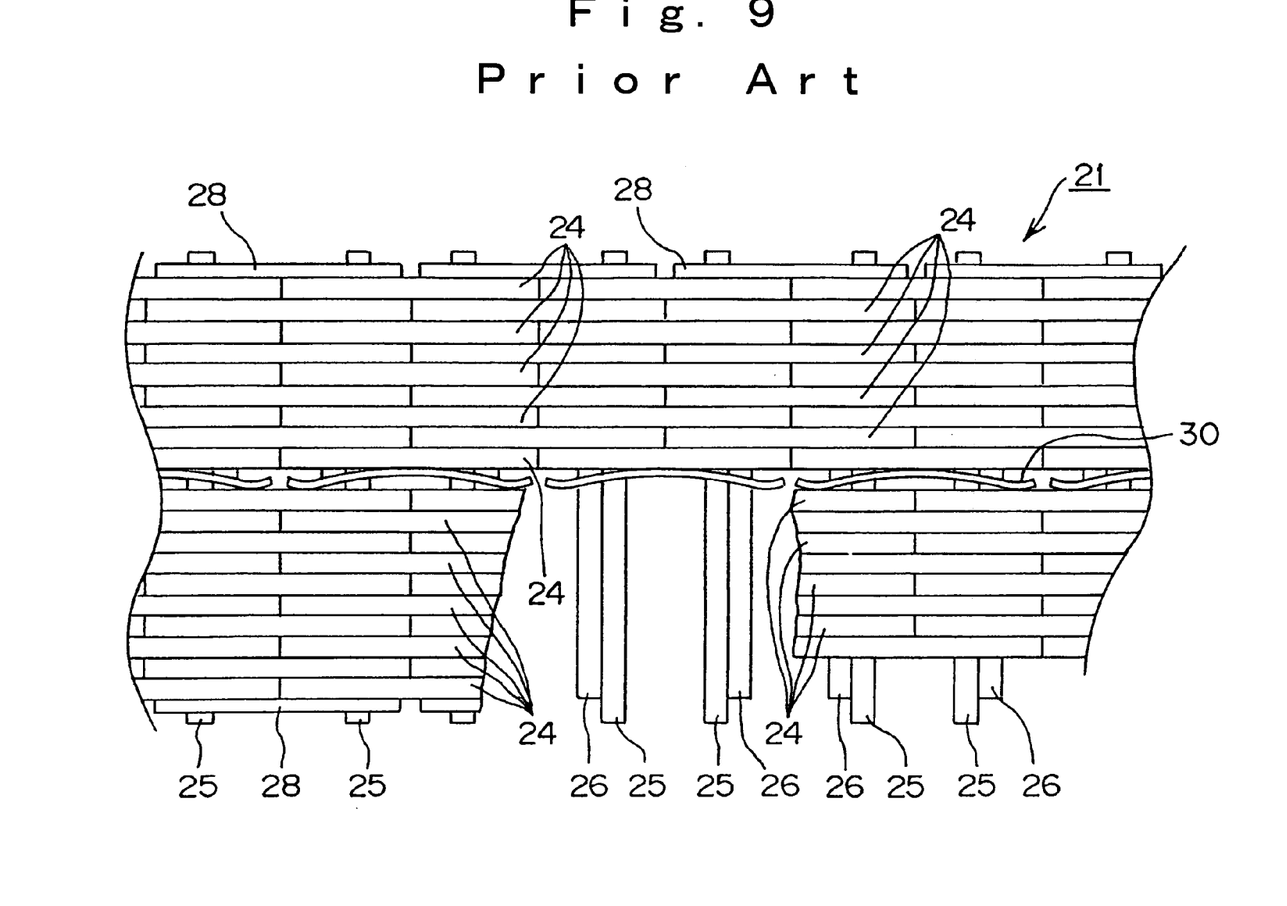
FIG. 9 is a plan view of a part of a conventional silent chain.
Figure 10:
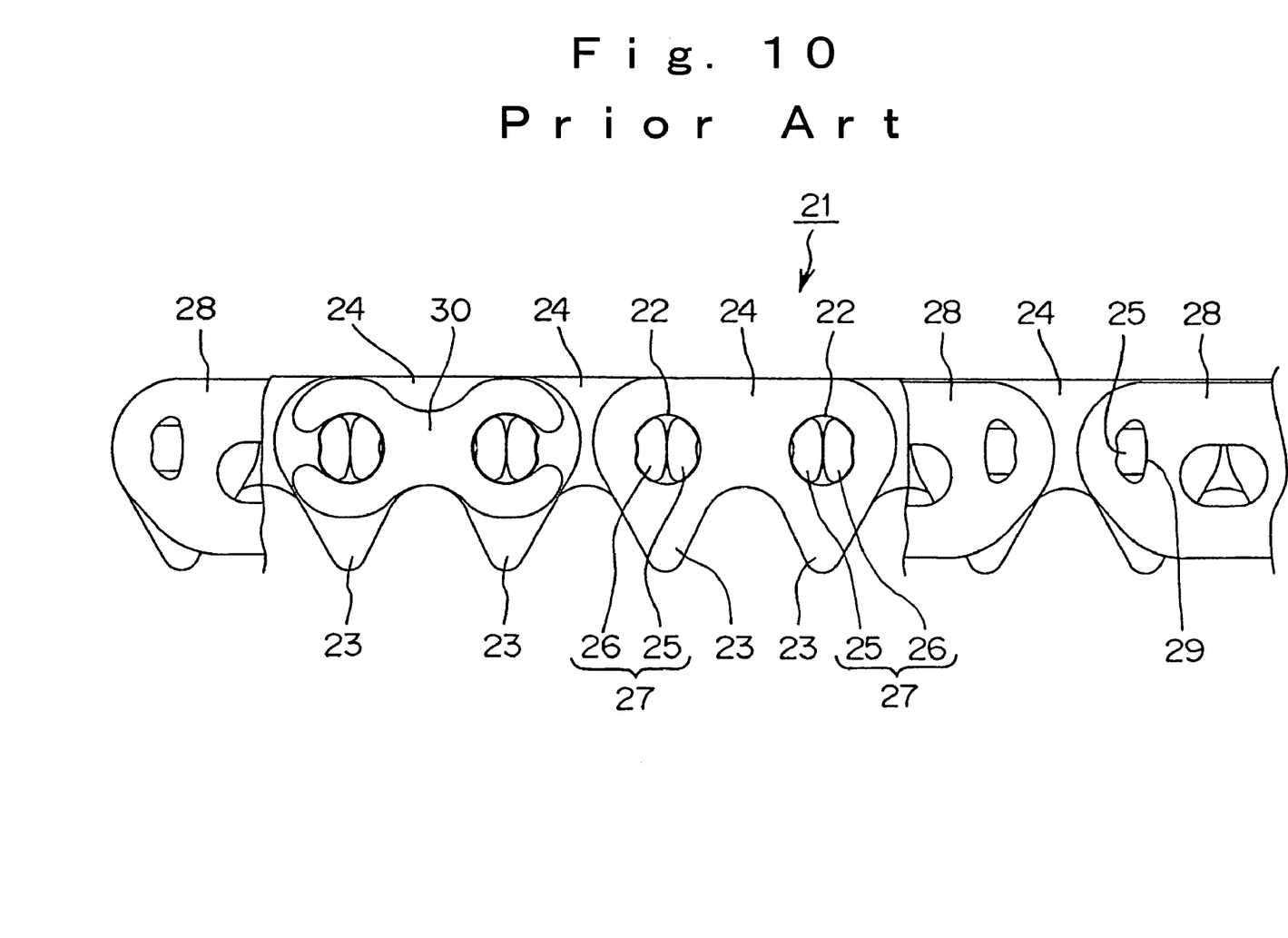
FIG. 10 is a partly broken-away side elevational view of the conventional silent chain.

A conventional rocker pin type silent chain 21 is shown in FIGS. 9 and 10 of this application. Widthwise rows of identically shaped link plates 24, each having a pair of pin holes 22 and a pair of teeth 23, are displaced longitudinally relative to one another, and interleaved and pivotally connected by connecting pins 27, which extend through the pin holes 22 of the link plates. Each connecting pin 27 is a rocker pin comprising a long pin 25 and a short pin 26. The ends of the long pin 26 are secured to non-circular pin holes 29 in guide plates 28 disposed on both outer sides in the direction of the width of the chain. The long pin 25 and the short pin 26 have substantially the same cross-sectional shape, and the back surfaces of the long and short pins roll against each other, allowing the adjacent rows of link plates 24 to rotate relative to one another.

Spring links 30 are provided centrally in the direction of the width of the silent chain 21. These spring links exert a biasing force pressing the link plates 24 toward guide plates so that the pressure at the contacting surfaces of the adjacent link plates is increased. As a result, relative rotation of the adjacent link plates 24 is restricted, and noise due to vibration in the free span region of the chain is suppressed.

Figure 11:
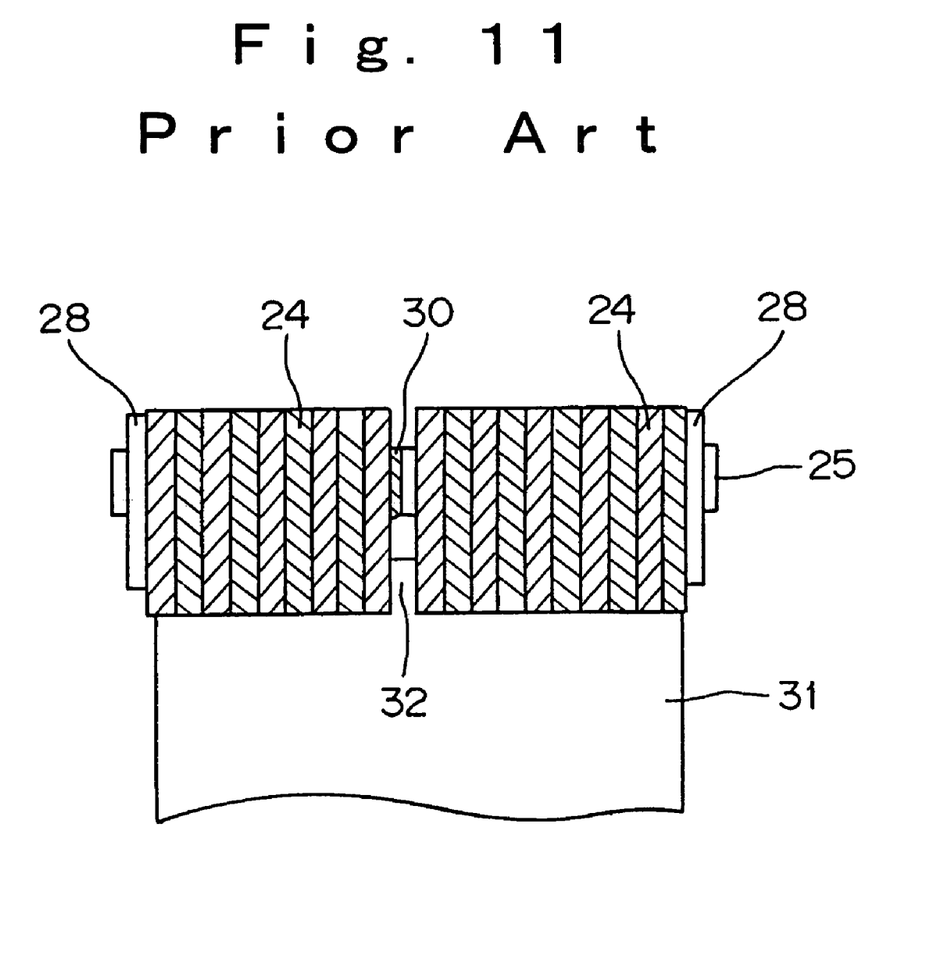
FIG. 11 is transverse cross-sectional view showing the engagement of the conventional silent chain with the tooth of a sprocket.

While the centrally located spring links 30, as shown in FIGS. 10 and 11 are effective in reducing noise, the operation of the chain can result in uneven sprocket wear. The portions of the sprocket teeth 31 that are engaged by the link plates 24 wear as a result of repeated contact, but the link plates do not cause wear at the location of the gap between the left and right groups of link teeth, where the spring links 30 are located. Thus, as shown exaggeratedly in FIG. 11, a step 32 is generated on the sprocket tooth surface. If the silent chain 21 is shifted, for example as a result of vibration, the chain can run on the step 32 and generate noise, and the chain can even disengage from the sprocket. Furthermore, since the spring links 30 are additional parts, the width and weight of the chain are increased, and the parts count and cost of manufacture are increased. These problems exist not only in the rocker pin type silent chain, but also in a round pin type silent chain in which spring links are provided.

Accordingly, objects of this invention include the solution to the above-mentioned problems, and the provision of a silent chain which can suppress noise due to vibration in its free span regions, and at the same time prevent the generation of steps due to wear of the sprocket teeth and avoid an increase in the number of parts of the chain and an increase of the chain width.

SUMMARY OF THE INVENTION

Briefly, a silent chain in accordance with the invention is composed of interleaved rows of link plates held by connecting pins secured to guide plates disposed along the sides of the chain. The guide plates are formed with protrusions, and are deformed so that they exert a spring action on the rows of link plates through the protrusions, pressing the link plates against one another to increase frictional contact between the link plates, and thereby reduce vibration and vibration noise.

More specifically, the silent chain according to the invention comprises link plates, guide plates and connecting pins. As in a conventional silent chain, each of the link plates has a pair of pin insertion holes and a pair of sprocket-engaging teeth. The link plates are disposed in rows extending widthwise of the chain, and the link plates of each row are displaced in the longitudinal direction of the chain relative to, and interleaved with, the link plates of an adjacent row. The interleaved link plates are arranged to form an endless loop. Moreover, as in a conventional silent chain, each of the guide plates has a pair of pin holes, disposed on both sides of the chain, and each guide plate has an outer portion positioned toward the outside of the loop, an inner portion positioned toward the inside of the loop, and two end portions each extending in a direction from the inside of the loop toward the outside of the loop. Connecting pins, secured to pin holes of the guide plates, extend through pin holes of the link plates as in the conventional silent chain. However, in the chain according to the invention, the guide plates have protrusions which contact link plates of the chain adjacent the guide plates. Each of the guide plates is formed of steel, and has sufficient springback that its protrusions bias its adjacent link plates toward the opposite side of the chain. Thus, the biasing forces exerted by the link plates maintain contact pressure between the interleaved link plates without the need for a centrally located spring plate or spring link.

The protrusions of the guide plates may be constituted by bent portions formed at least at one of the inner and outer portions of each guide plate, or by bent portions formed at least at one of the two end portions of each guide plate.

According to the invention, the link plates are biased from both sides by the protrusions of the guide plates, and the surface contact pressure between adjacent link plates is increased so that a stable frictional force is applied to the link plates. The increased contact pressure restricts relative rotation between the adjacent link plates, and, at the same time also restricts flexion of the link plates. As a result, vibration of the free span regions of the silent chain is reduced, and noise due to vibration is suppressed.

Furthermore, since the guide plate itself has a spring function, it is not necessary to provide spring links as additional parts. The total parts count is not increased, and the process of assembly of the chain is simplified. An increase in the weight of the silent chain and widening of the chain are also avoided. The chain width direction can be prevented. Thus, the invention contributes to an overall reduction in the size and weight of a silent chain transmission device.

Since the protrusions which apply a force to the link plates are formed by bending inner, outer or end portions of the guide plates, the protrusions can be formed easily, and it is unnecessary to provide the protrusions as members separate from the guide plates.

DETAILED DESCRIPTION OF THE PREFERRED EMBODIMENTS

Figure 1:
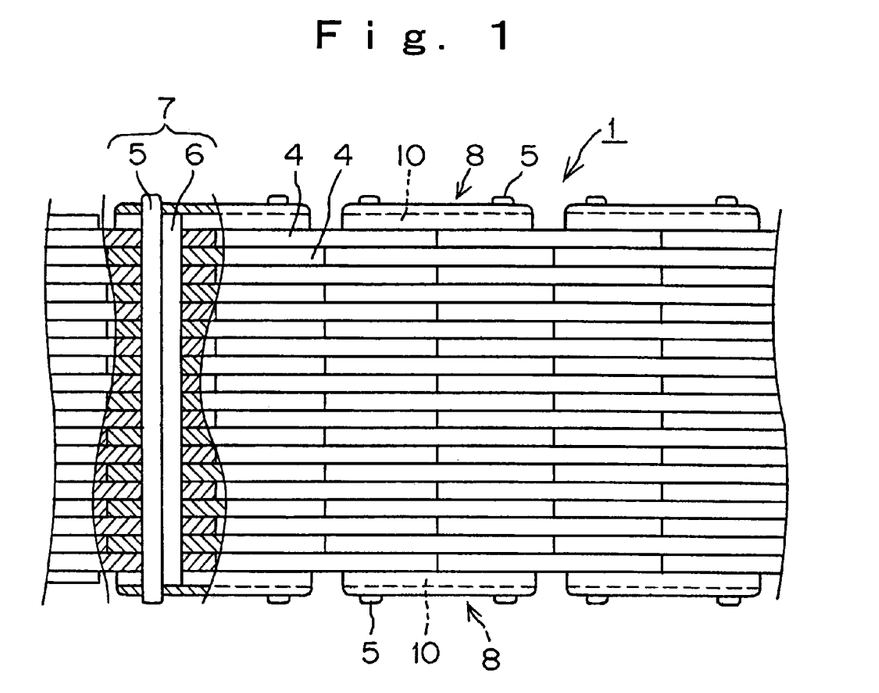
FIG. 1 is a plan view, partly in section, of a portion of a silent chain according to a first embodiment of the invention.
Figure 2:
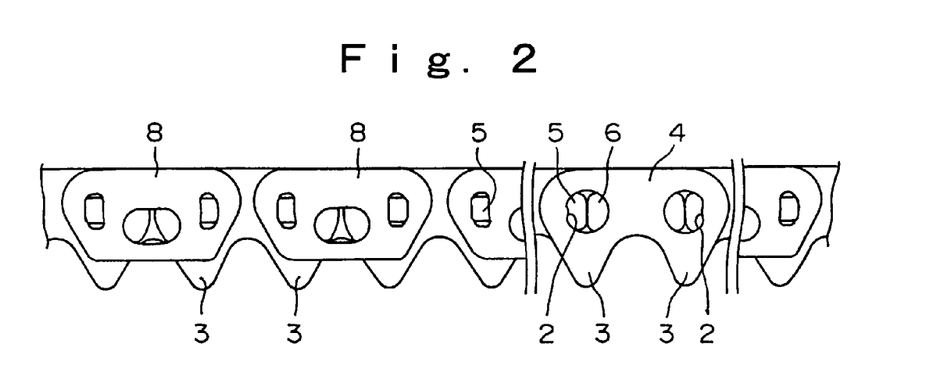
FIG. 2 is a partly cut-away side elevational view of the chain of FIG. 1.
Figure 3:
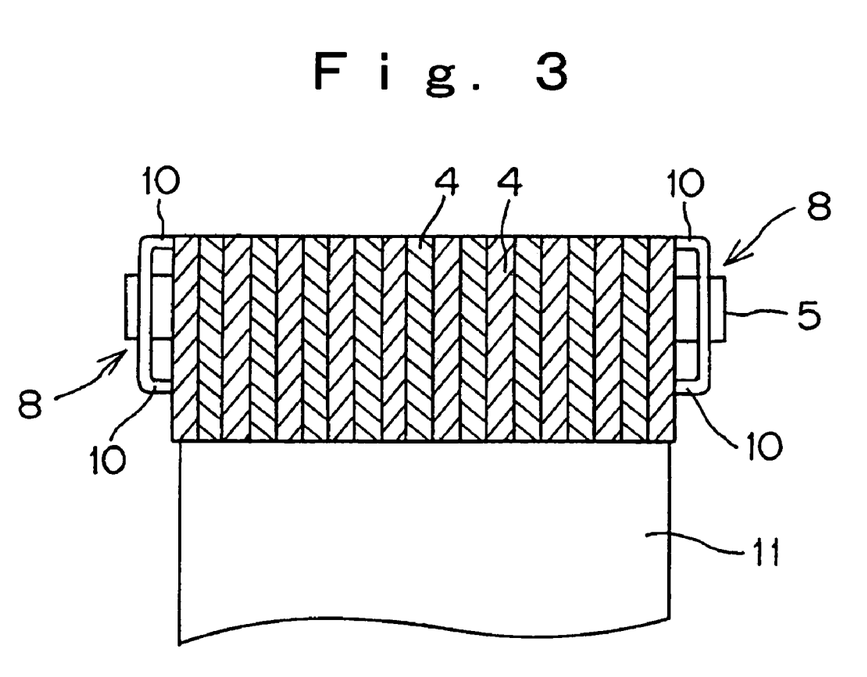
FIG. 3 is a transverse cross-sectional view of the silent chain of FIG. 1 showing the engagement of the chain with the tooth of a sprocket.

The silent chain 1 of FIG. 1 is a rocker pin type silent chain comprising a plurality of identical link plates 4, each having a pair of pin insertion holes 2 and a pair of teeth 3. The link plates 4 are arranged in rows widthwise of the chain. The rows are longitudinally displaced relative to one another, and the link plates of adjacent rows are interleaved. Guide plates 8, each having a pair of pin holes 9 (FIG. 4(B)), are disposed on the outermost sides of the chain. The link plate rows are pivotably connected by connecting pins 7, the pins 7 extending through pin holes 2 of the link plates 4, and connecting the link plate rows so that they form an endless loop.

The connecting pins 7 are rocker pins, each comprising a long pin 5 and a short pin 6. Both ends of the long pin are secured to non-circular pin holes 9 in guide plates 8 by press-fitting. The long pin 5 and the short pin 6 have substantially the same cross-sectional shape, and their back surfaces roll on each other, allowing the adjacent rows of link plates to rotate relative to one another.

Figure 4:
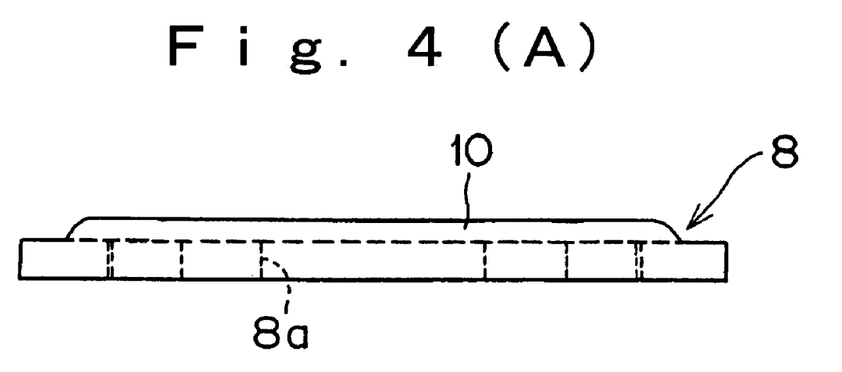
FIG. 4(A) is a plan view of a guide plate according to the invention.
FIG. 4(B) is a side-elevational view of the guide plate.
FIG. 4(C) is a cross-sectional view of the guide plate taken on plane 4(C)-4(C) of FIG. 4(B)

The guide plate 8 is made of steel, and, as shown in FIG. 4(C), has protrusions 10, one being an upper protrusion, on a portion of the guide plate positioned toward the outside of the loop formed by the chain, and the other being a lower protrusion on a portion of the guide plate position toward the inside of the loop. The steel plate is bent to form the protrusions 10, and is then subjected to thermal treatment. The guide plate 8 exhibits a springback, that, is a spring function by which it tends to return to its original shape when deformed. As shown in FIGS. 4(B) and 4(C), a through hole 8a is provided in the guide plate to reduce its weight, and the overall weight of the silent chain 1.

In the assembly of the chain, both ends of each long pin 5 are secured to a non-circular pin hole 9 of a guide plate 8, with the central portion of the guide plate slightly bulged toward the adjacent link plates. The spring action of the guide causes its protrusions 10 to press against the link plates. Consequently, the spring action of the guide plates on both sides of the chain biases the link plates together in the direction of the chain width.

Figure 8:
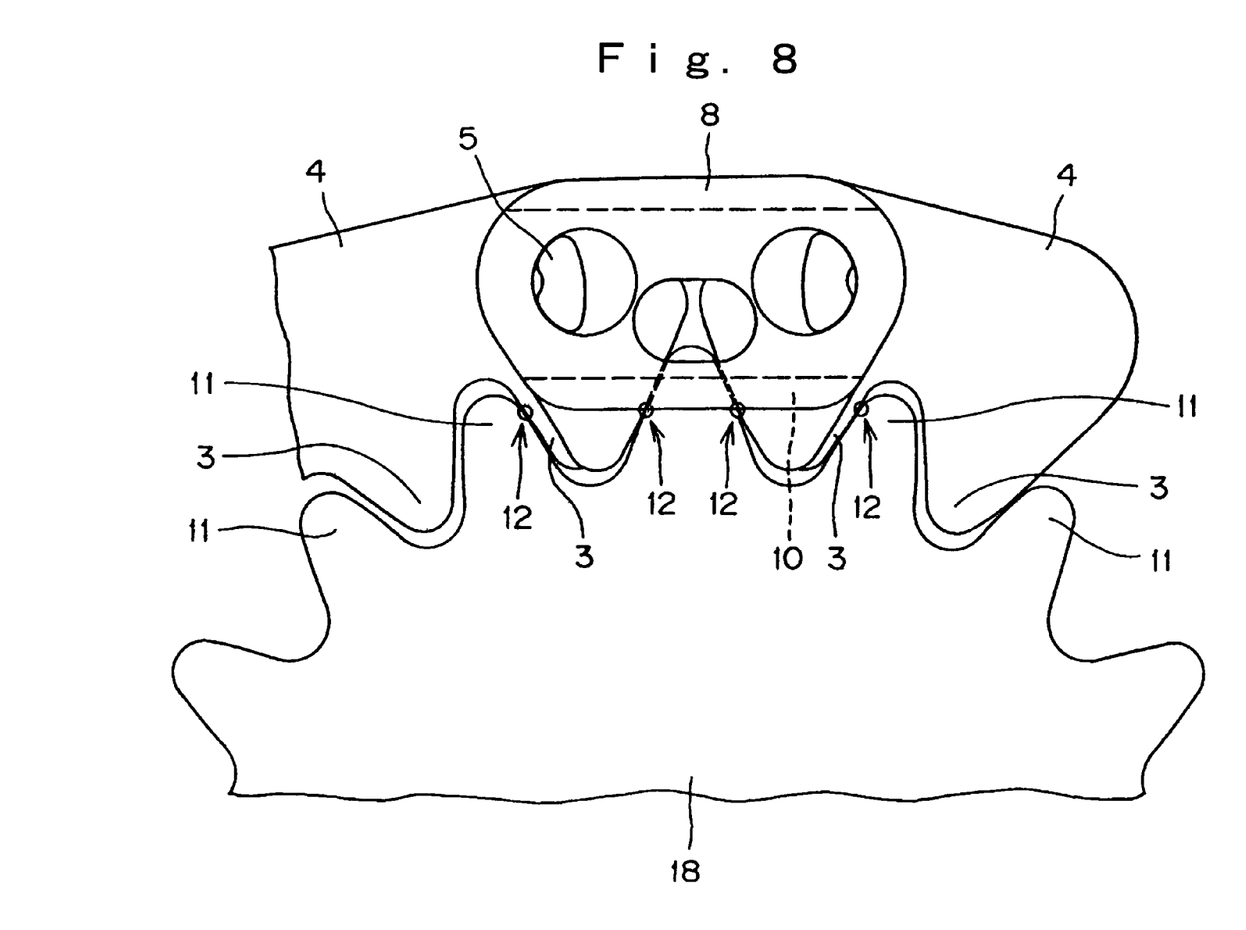
FIG. 8 is a schematic side elevational view, showing the engagement of the silent chain of the first embodiment with sprocket teeth.

As shown FIG. 8, a protrusion 10 positioned on the guide plate 8 toward the inside of the loop formed by the chain, is preferably formed adjacent to the positions 12 where the sprocket teeth 11 of sprocket 18 and the teeth 3 of the link plate 4 engage with each other. Thus, the lower protrusion 10 of guide plates contact the adjacent link plates 4 at the position where the start of engagement with the sprocket 18 and the start of disengagement with the sprocket 18 take place. The positioning of the lower protrusion 10 at the engagement position achieves superior restriction of the relative rotation between adjacent link plates 4.

In the assembled silent chain 1, the link plates 4 are engaged by the protrusions 10 of the guide plates 8 and consequently, the link plates 4 are pressed together, in the chain width direction, from both sides by the spring action of the guide plates 8. The biasing action increases pressure at the contact surfaces between adjacent link plates 4, and applies as table frictional force to the link plates, restricting relative rotation. Consequently, vibration due to repeated flexing of the chain is reduced, and noise due to vibration is suppressed.

In the silent chain of the above-described embodiment, the protrusions 10 are formed by bending both the upper and lower portions of the guide plates 8 (the outer and inner portions respectively, relative to the chain loop). However, it is possible to achieve similar results by bending only one of the upper and lower portions of the guide plates.

In the second embodiment of the invention, as shown in FIGS. 5 to 7(C), a silent chain 14 has a guide plate 15 different from that of the previously described embodiment. The link plates 4, the connecting pins 7, including long pins 5 and short pins 6, which are common to both embodiments, are designated by the same reference numbers. In this embodiment, each of the guide plates 15 on the outer sides of the chain has pair of pin holes 16, and the link plates are pivotably connected by connecting pins 7, which extend through holes 2 of the link plates 4.

Figure 5:
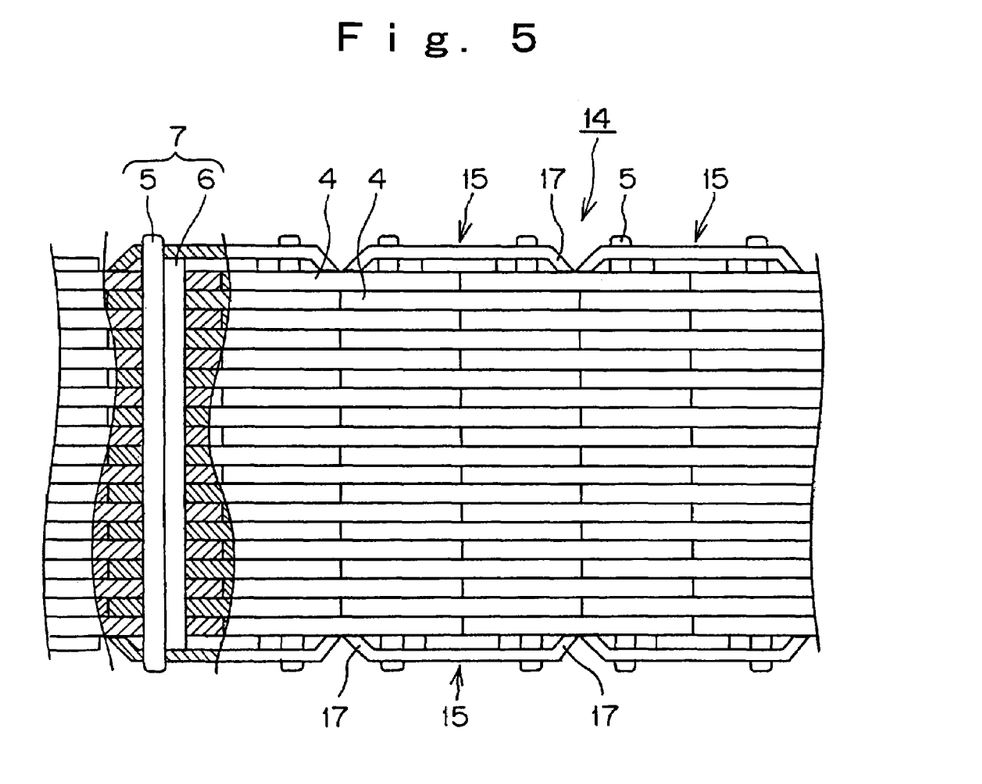
FIG. 5 is a plan view, partly in section, of a portion of a silent chain according to a second embodiment of the invention.
Figure 6:
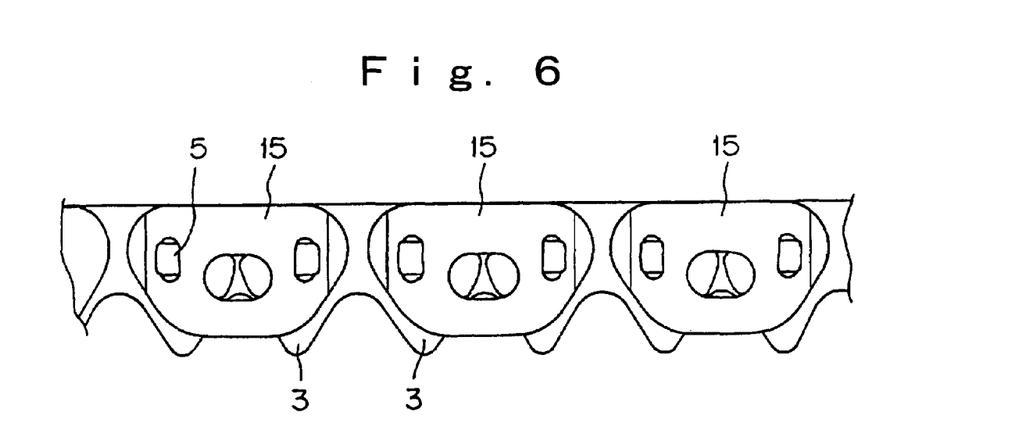
FIG. 6 is a side elevational view of the chain of FIG. 5

As in the first embodiment, the connecting pin 7 is a rocker pin comprising a long pin 5 and a short pin 6. Both ends of the long pin 5 are secured to non-circular pin holes 16 in guide plates. The long pin 5 and the short pin 6 have substantially the same cross-sectional shape, and their back surfaces roll on each other so that the adjacent link plate rows 4 are relatively rotatable.

Figure 7A:
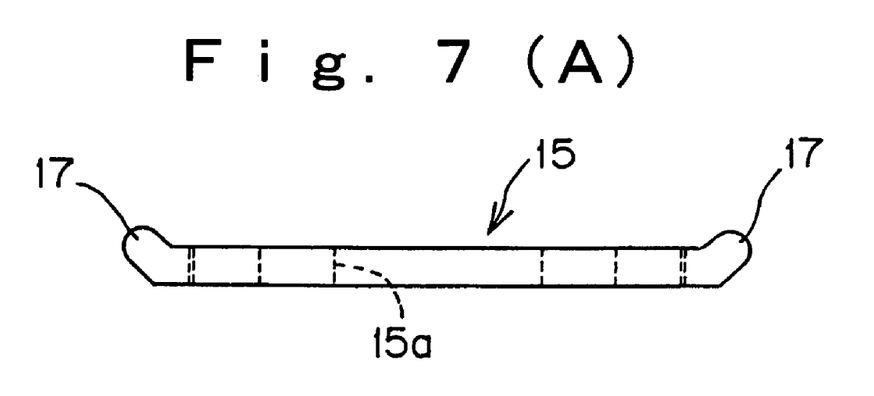
FIG. 7(A) is a plan view of a guide plate of the chain according to the second embodiment of the invention.
Figure 7B:
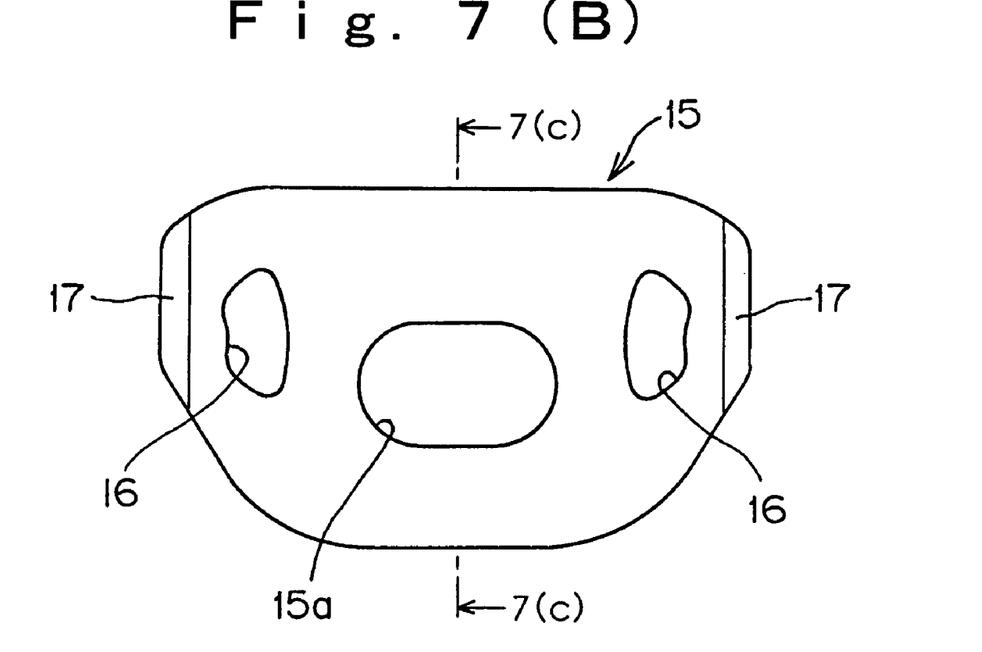
FIG. 7(B) is a side-elevational view of the guide plate of FIG. 7(A)
Figure 7C:
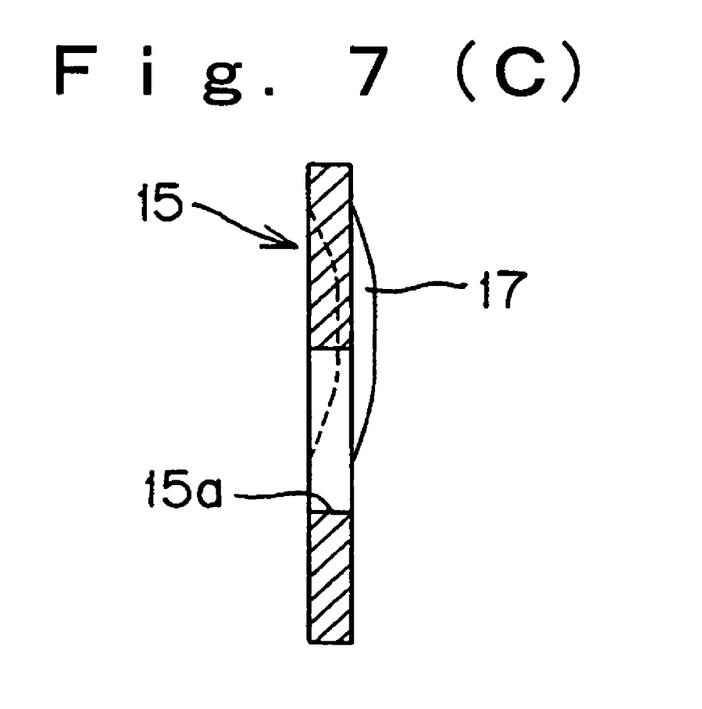
FIG. 7(C) is a cross-sectional view of the guide plate taken on plane 7(C)-7(C) of FIG. 7(B)

The guide plate 15 is made of steel, and, as shown in FIG. 7(A) both right and left end portions of a steel plate are bent to form protrusions 17. Following the formation of the protrusions, the steel plate is subjected to thermal treatment. The guide plate 15 exhibits a springback, and, as shown in FIGS. 7(B) and 7(C), a through hole 15a is provided in the guide plate to reduce its weight, and the overall weight of the silent chain 14. Both ends of each long pin 5 are secured to a non-circular pin hole 16 of guide plates 15. The central portion of the guide plate is a slightly bulged toward the adjacent link plates. The spring action of the guide causes its protrusions 17 to press against the link plates. Consequently, the spring action of the guide plates on both sides of the chain biases the link plates together in the direction of the chain width.

As in the first embodiment, in the assembled silent chain 15, the outer link plates 4 are engaged by the protrusions 17 of the guide plates and consequently the link plates are pressed together, in the chain width direction, from both sides by the spring action of the guide plates 15. The biasing action increases pressure at the contact surfaces between adjacent link plates 4, and applies a stable frictional force to the link plates, restricting relative rotation. Consequently, vibration due to repeated flexing of the chain is reduced, and noise due to vibration is suppressed.

In the silent chain in accordance with the second embodiment of the invention, the protrusions 17 are formed by bending both the right and left end portions of the guide plates 15. However, it is possible to achieve similar results by bending only one of the right and left end portions of the guide plates.

Both of the embodiments described above are rocker pin type silent chain using a rocker pin comprising a long pin and a short pin, and having the link plates interleaved individually. However, the same advantages can be realized in a round pin type silent chain using pins having a circular cross-section as connecting pins, and in a chain in which the link plates are interleaved in groups.

I claim:

1. A chain transmission comprising a silent chain in the form of a loop having an inside and an outside, and at least one sprocket inside the loop and having sprocket teeth in mesh with the chain, the chain comprising;

link plates, each having a pair of pin insertion holes and a pair of sprocket-engaging teeth, the link plates being disposed in alternating link rows and guide rows, each extending widthwise of the chain, and the link plates of each link row being displaced in the longitudinal direction of the chain relative to, and interleaved with, the link plates of an adjacent guide row, the interleaved link plates being arranged to form an endless loop;

guide plates, each having a pair of pin holes, disposed on both sides of the chain in each guide row, each said guide plate having an outer portion positioned toward the outside of the loop, an inner portion positioned toward the inside of the loop, and two end portions each extending in a direction from the inside of the loop toward the outside of the loop; and connecting pins secured to pin holes of the guide plates, and extending through pin holes of the link plates;

in which the guide plates have protrusions which contact link plates of the chain adjacent the guide plates;

in which each of the guide plates is formed of steel having sufficient springback that its protrusions bias its adjacent link plates toward the opposite side of the chain, whereby biasing forces exerted by the link plates maintain contact pressure between the interleaved link;

in which said protrusions of the guide plates are constituted by bent portions formed at the inner portion of each guide plate toward the inside of the loop formed by the chain; and in which each said protrusion of the guide plate in each guide row is located at a position on the guide plate such that, when the outer flanks of the teeth of the link plates in an adjacent link row engage with and disengage from a sprocket tooth at a line of contact, the protrusion is substantially aligned with the line of contact.

* * * * *